United States Patent Office 3,021,361
Patented Feb. 13, 1962

3,021,361
l-PROPOXYPHENE N-OXIDE AND SALTS THEREOF
Albert Pohland, Indianapolis, Ind., assignor to Eli Lilly and Company, Indianapolis, Ind., a corporation of Indiana
No Drawing. Filed Sept. 10, 1959, Ser. No. 843,329
3 Claims. (Cl. 260—490)

This invention relates to a novel amine oxide α-l-1,2-diphenyl-2-propionoxy-3-methyl-4-dimethylaminobutane N-oxide, and to its acid addition salts. The amine oxide can be represented by the following formula

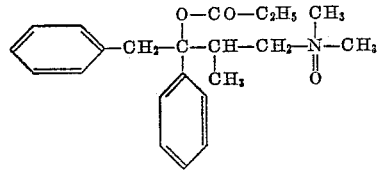

The above-represented compound is the N-oxide of the tertiary amine base, α-l-1,2-diphenyl-2-propionoxy-3-methyl-4-dimethylaminobutane, to which for convenience the generic name l-propoxyphene has been applied. The N-oxide of the base, identified herein as l-propoxyphene N-oxide, is a white, crystalline solid which generally crystallizes with one or more molecules of solvent or crystallization, for example, water or alcohol. The N-oxide of l-propoxyphene is easily prepared from its parent optically active base by oxidative procedures, illustratively, by dissolving the tertiary amine in a suitable solvent such as methanol or acetic acid, and oxidizing the amine base with an oxidizing agent, for example, benzoyl, peroxide, ozone, neutral Caro's acid, or hydrogen peroxide. The N-oxide which is formed is isolated by conventional procedures.

The salts of l-propoxyphene N-oxide are in general white, crystalline salts. They can readily be prepared from the N-oxide base by customary procedures, for example, by reacting stoichiometric amounts of the amine oxide and the acid in a mutual solvent, and isolating the salt by evaporation of the solvent or by the addition of a miscible solvent in which the salt is insoluble. Illustrative nontoxic salts include the hydrochloride, hydrobromide, sulfate, tartrate, maleate, succinate, and like salts. For therapeutic use, the acid employed for the preparation of the salt should obviously be one which is relatively nontoxic and hence can provide a nontoxic salt.

The novel compounds of this invention have highly effective antitussive action, exhibiting upon oral administration a greater antitussive activity than l-propoxyphene, and having almost as much antitussive activity as morphine, when tested by standard pharmacological tests.

l-Propoxyphene can be prepared by the method described by Pohland and Sullivan in J. Am. Chem. Soc., 77, 3400 (1955). The l-propoxyphene which is formed along with d-propoxyphene, is separated, and is used as the starting material for the preparation of the compounds of this invention.

This invention is further illustrated by the following examples:

EXAMPLE 1

Preparation of l-propoxyphene N-oxide

A mixture of 5 g. of l-propoxyphene, 50 ml. of methanol, and 7 ml. of 30 percent aqueous hydrogen peroxide is allowed to stand at ambient room temperature for about 16 hours, during which time the l-propoxyphene is oxidized to l-propoxyphene N-oxide. The volatile constituents of the reaction mixture are removed by evaporation in vacuo while maintaining the evaporation temperature below about 25° C. The residual oil comprising l-propoxyphene N-oxide is dissolved in 50 ml. of methanol. 50 mg. of platinum oxide catalyst are added to the solution, and the mixture is shaken to destroy any remaining hydrogen peroxide. The methanol solution containing the platinum oxide catalyst is kept at ambient room temperature for about an hour, after which it is filtered to remove the catalyst. The methanol is removed by evaporation in vacuo in the cold. The residual oil, comprising l-propoxyphene N-oxide, is dissolved in about 30 ml. of ethyl acetate, and low-boiling petroleum ether is added until the solution becomes slightly turbid. The solution is kept at about 0° C. for about 16 hours during which time crystalline l-propoxyphene N-oxide precipitates in the form of its monohydrate. The crystals which are collected by filtration, melt with decomposition at about 93–94° C. *Analysis.*—Calculated: C, 70.8; H, 8.39; N, 3.76. Found: C, 71.00; H, 8.74; N, 4.03.

EXAMPLE 2

Preparation of l-propoxyphene N-oxide hydrochloride

To a solution of 1 g. of l-propoxyphene N-oxide in 40 ml. of ethyl acetate is added a solution of 1 mg. of anhydrous hydrogen chloride in 20 ml. of ethyl acetate. The mixture is stirred for a few minutes, is diluted with an equal volume of ether and is cooled, whereupon l-propoxyphene N-oxide hydrochloride crystallizes out. The salt is recrystallized twice from methanol-ethyl acetate solvent mixture. The purified salt melts with decomposition at about 180–181° C. *Analysis.*—Calculated: C, 67.46; H, 7.72; N, 3.59. Found: C, 68.22; H, 7.97; N, 3.80.

I claim:
1. A member of the group consisting of l-propoxyphene N-oxide and the nontoxic acid addition salts thereof.
2. l-Propoxyphene N-oxide.
3. l-Propoxyphene N-oxide hydrochloride.

References Cited in the file of this patent
UNITED STATES PATENTS 2,728,779    Pohland _____ Dec. 27, 1955
2,862,968    Tiffany _____ Dec. 2, 1958